METHOD OF MAKING MAGNETIC CORE LAYERS

Filed Aug. 5, 1952

INVENTOR.
Wilbur G. Hespenheide
BY Gray, Mase, Wildermuth & Dunson
ATTORNEYS.

United States Patent Office 2,803,570

Patented Aug. 20, 1957

2,803,570

METHOD OF MAKING MAGNETIC CORE LAYERS

Wilbur G. Hespenheide, Columbus, Ohio, assignor, by mesne assignments, to Michigan Bumper Corporation, Grand Rapids, Mich., a corporation of Michigan Application August 5, 1952, Serial No. 302,801

3 Claims. (Cl. 148—6.35)

This invention relates to laminates. More particularly, it relates to a material composed of very thin alternating layers of one metal and an oxide of another metal, and to a method of making such material.

Laminates of metals and metal oxides are widely used in industry. In magnetic cores, for example, layers of magnetic material are frequently separated by interposed layers of a metal oxide. The metal oxides may serve as insulators, rectifiers or semiconductors.

One of the customary methods of preparing such laminates is to heat or otherwise treat a sheet of magnetic material to form an oxide layer thereon. Several of the oxidized sheets are then joined together. An alternate method consists of applying a metal oxide to the surface of a magnetic material in the form of a dust, in a liquid vehicle, or by electrophoresis. Again, several sheets are combined to form a laminate.

The manufacture of laminates for such magnetic cores by these methods has not resulted in entirely satisfactory materials. In order to secure a high space factor, the thickness of the insulating layer must be very thin in comparison to the thickness of the magnetic sheet. In cores for high-frequency use, the magnetic layer itself must be thin. The handling of these very thin layers is difficult, and the resulting fabrication costs are high.

It is often necessary to subject magnetic cores to a high temperature hydrogen annealing treatment to develop optimum magnetic properties. Some oxide layers, such as iron oxide, are reduced during this annealing and the insulating characteristics are lost. Consequently, it is customary to anneal the prior-art materials before assembly. However, after the laminate is assembled, a subsequent anneal is necessary to relieve stresses.

Accordingly, one of the objects of this invention is to provide a novel method of making metal and metal oxide laminates.

A further object is to provide a laminate composed of extremely thin layers of metal and metal oxide.

Another object is to provide a method of making magnetic cores.

A still further object is to provide a method of fabricating cores of ultra thin magnetic material, having a high space factor and suitable for use at high frequencies.

Other objects and advantageous features will be apparent from the following detailed description and drawings.

Figure 1:
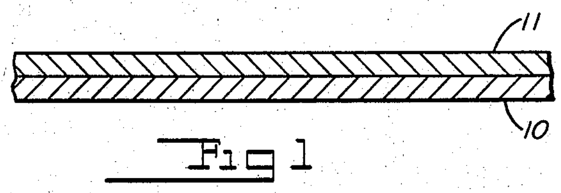
Fig. 1 shows a cross-sectional view of a laminate formed of two metals.
Figure 2:
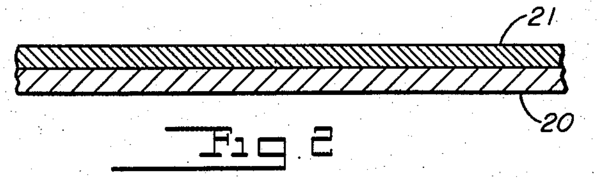
Fig. 2 shows a cross-sectional view of a laminate of the same two metals in which one of the metals has been oxidized.

In general, the method of this invention comprises forming alternate layers of two metals as shown by 10 and 11 in Fig. 1. The two metals are selected so that one of the metals is more easily oxidized than the second. The composite material is heated until one metal is partially or completely oxidized, taking oxygen away from the second metal or from the surrounding atmosphere. Fig. 2 shows the oxidation of metal layer 21 in preference to metal layer 20. For special magnetic properties, the laminate may then be subjected to a high-temperature hydrogen anneal to remove residual oxygen and/or other impurities from the magnetic material layers.

Unless special electrical properties are desired, any two metals may be selected which will not react with each other or diffuse into each other during the heating step. However, in making laminates in which the oxidized layer is to serve as an insulator, rectifier, or semiconductor between layers of magnetic material, special metals must be selected.

The magnetic materials are selected from the group consisting of iron, nickel, cobalt and their alloys. The metals which are to be oxidized between layers of the magnetic materials should also have the property of forming oxides which are insulators, rectifiers, or semiconductors. These oxides should also have a melting point above the temperature at which the oxidation treatment takes place, and should be capable of reducing the magnetic materials. Examples of such metals are selected from the group consisting of aluminum, titanium, calcium, magnesium, vanadium, chromium, zinc, tin, barium, manganese, silicon, strontium, tungsten, and zirconium.

In forming laminates, which are to be subsequently annealed at high temperatures in a strongly reducing atmosphere, metals should be selected which are capable of retaining oxygen under such reducing conditions. Examples of these are aluminum, titanium, calcium, magnesium, and vanadium.

The initial thin layers of the metals may be formed by any of the well-known methods, such as electrodeposition, metal spraying, vapor deposition, or sputtering. It is also possible to coat sheets of magnetic materials with the metal to be oxidized and then to pack-roll to reduce the magnetic material to a desired thickness. Other procedures will suggest themselves to those skilled in the art.

When a metal laminate of the desired physical measurements has been formed, the oxidation is accomplished by heating in an essentially inert atmosphere, such as a neutral, mildly oxidizing or mildly reducing atmosphere. The metal to be oxidized will remove all of the oxygen present in the other metal. However, it may also be desirable to introduce additional oxygen, depending on the metals used, temperature, speed of oxidation and any special properties required in the laminate.

The temperature in which the oxidation step is carried out may vary over a wide range and a higher temperature will speed the process. However, this temperature should not exceed the melting point of the metal selected or oxide formed.

The time required for oxidation is also dependent on the metals used, temperature, and the desired electrical properties. The electrical properties of the oxide layer may be conveniently checked by passing an electric current through it.

As heretofore mentioned, in the case of magnetic materials, an additional high-temperature anneal in a hydrogen, or other strongly reducing, atmosphere may be desirable. Such an anneal is well known in the art. However, the laminates formed by this invention are particularly adapted to such an annealing treatment, and are completely preformed prior to the anneal.

The following examples will serve to illustrate the invention with greater particularity:

*Example I*

An aluminum ring was cleaned in an alkaline electrolytic bath and then dipped in diluted hydrochloric acid. Using a bath of:

| | |
|---|---|
| Ferrous chloride ($FeCl_2 \cdot 4H_2O$) g./l. | 630 |
| Sodium chloride (NaCl) g./l. | 120 |
| Water | Balance |
| pH | 1.5 |
| Temperature ° F. | 200 |
| Current density amp./sq. ft. | 100 |

a layer of iron 0.001 inch in thickness was deposited in ten minutes. The plated surface was rinsed in water and then oxidized by immersion for 30 seconds in an aqueous solution of 780 g./l. of Jetal salts boiling at 285° F. (Jetal salts is a mixture predominantly sodium hydroxide and the balance nitrates or nitrites or mixtures, and is manufactured by the Alrose Chemical Company, Providence, Rhode Island). The oxidized surface was rinsed, and a layer of tin 0.00005 inch in thickness was deposited in 2.5 minutes from a bath of:

| | |
|---|---|
| Sodium stannate ($Na_2SnO_3 \cdot 3H_2O$) g./l. | 120 |
| Sodium hydroxide (NaOH) g./l. | 10.5 |
| Sodium acetate | 15 |
| Hydrogen peroxide cc./l. | 0.5 |
| Water | Balance |
| Temperature ° F. | 175 |
| Current density amp./sq. ft. | 25 |

The tin plate was rinsed and a second iron layer was plated. The procedure of iron plating, oxidation, and tin plating was continued until there was a total of ten layers each of iron and tin. The edges of the composite ring were ground to expose the aluminum, which was then dissolved in an aqueous solution containing 400 g./l. sodium hydroxide.

Electrical windings were applied to the laminated toroid, and the core loss was measured at various frequencies. The windings were removed and the toroid was then heated for 165 minutes at 800° F. in an argon atmosphere. The windings were replaced and the core loss was again measured.

Electrical windings were applied to an iron toroid, 10 mils in thickness, and the core loss was measured. This toroid was heated for 3 hours at 800° F. in an argon atmosphere. The core loss values were not changed.

The following table lists the values obtained during tests made on the two specimens of this example:

| Frequency (C. P. S.) | 200 | 1,000 | 2,580 |
|---|---|---|---|
| Core loss (watts/lb.): | | | |
| Laminate (before heating) | 5.33 | 23.4 | 30.5 |
| Laminate (after heating) | 4.78 | 18.5 | 19.1 |
| Iron | 3.75 | 16.5 | 21.5 |

*Example II*

A flat laminate of iron and tin was plated on copper foil. The same procedure was used as in Example I except that the oxidizing step was omitted. Five tin layers and four iron layers were plated. The laminate was heated in an argon atmosphere for one hour at 1200° F. Upon sectioning, it was found that the tin layer no longer had a metallic luster but was gray, indicating the formation of a mixture of stannous and stannic oxides.

*Example III*

A laminate of chromium and iron was plated on copper foil. The iron plating was similar to that of Example I, but was not subsequently oxidized. A layer of chromium 0.00005 inch thick was plated on the iron from a bath of:

| | |
|---|---|
| Chromic oxide ($Cr_2O_3$) g./l. | 400 |
| Sulfuric acid ($H_2SO_4$) g./l. | 4 |
| Water | Balance |
| Temperature ° F. | 130 |
| Current density amp./sq. ft. | 300 |

Five layers each of iron and chromium were deposited. The laminate was heated at 1500° F. for one hour in an argon atmosphere. When it was sectioned, it was found that the chromium layer was no longer bright and metallic, and was anisotropic when examined in a polarized light, indicating that it had been oxidized.

It has been found by metallographic examination of the laminates of this invention that any surface defects or irregularities on the base material, or on any one of the plated layers, will be reproduced in succeeding layers. If insulated sheets are formed separately, as in customary commercial practice, the roughness may be as great as 0.5 mil peaks. When the prior-art sheets are placed together, the peaks of two adjacent sheets may contact each other by cutting through the insulating layer, resulting in undesirable short circuits. The laminate of this invention avoids this possibility.

As can be seen, this invention can be utilized to form laminates of metal and metal oxides from a large group of metals. In addition, it is particularly adapted to the formation of exeremely thin layers less than 0.00015 in thickness. The fabrication problems of prior-art methods have been minimized to a large extent, and magnetic cores for high-frequency use may be produced with a higher space factor than has heretofore been possible.

What is claimed is:

1. The method of making a magnetic core material, which comprises forming a continuous layer of a magnetic material selected from the group consisting of iron, cobalt, nickel, and alloys thereof, partially oxidizing said magnetic material, forming on said layer a continuous layer of a second metal which is more easily oxidized than said magnetic material, and thereafter heating said layers in an essentially inert atmosphere at a temperature below that at which melting of either metal or the oxide formed takes place until a laminate of said magnetic material and an oxide of said second metal is formed.

2. The method of making a magnetic core material which comprises forming a continuous oxygen-bearing layer of a magnetic material selected from the group consisting of iron, cobalt, nickel, and alloys thereof, forming on said layer a continuous layer of a second metal selected from the group consisting of aluminum, titanium, calcium, magnesium, vanadium, chromium, zinc, tin, barium, manganese, silicon, strontium, tungsten, and zirconium, and thereafter heating said layers at a temperature below that at which melting of either metal or the oxide formed takes place in an essentially inert atmosphere, until a laminate of said magnetic material and an oxide of said second metal is formed.

3. The method of making a magnetic core material which comprises forming a continuous layer of a magnetic material selected from the group consisting of iron, cobalt, nickel, and alloys thereof, partially oxidizing said magnetic material, forming on said layer a continuous layer of a second metal selected from the group consisting of aluminum, titanium, calcium, magnesium, vanadium, chromium, zinc, tin, barium, manganese, silicon, strontium, tungsten, and zirconium, and thereafter heating said layers in an essentially inert atmosphere at a temperature below that at which melting of either metal or the oxide formed takes place until a laminate of said magnetic material and an oxide of said second metal is formed.

References Cited in the file of this patent

UNITED STATES PATENTS

| | | |
|---|---|---|
| 2,156,262 | Fink | May 2, 1939 |
| 2,221,596 | Lorenz | Nov. 12, 1940 |
| 2,221,983 | Mayer et al. | Nov. 19, 1940 |
| 2,453,772 | Whitfield | Nov. 16, 1948 |
| 2,497,066 | Brennan | Feb. 14, 1950 |